INVENTOR
D. G. LUDLUM

INVENTOR
D. G. LUDLUM
BY
ATTORNEYS

United States Patent Office 3,204,099
Patented Aug. 31, 1965

3,204,099
ALPHA PARTICLE COUNTER AND INTEGRATING CIRCUIT ARRANGEMENT
Donald G. Ludlum, Santa Fe, N. Mex., assignor to Eberline Instrument Corporation, Santa Fe, N. Mex., a corporation of New Mexico
Filed May 10, 1961, Ser. No. 117,252
18 Claims. (Cl. 250—83.6)

This invention relates to monitors and in particular to monitors for the measurement of the quantity of alpha particles emanating from a portion of the person of an individual.

In industries where workers may be subject to the hazards of contamination by undesirable emanations, as alpha particles, it is desirable to subject each of the workers to periodic examinations to determine whether or not an undue amount of contamination exists on his person.

In the past such contaminations have been measured with the aid of rate meters which give an indication by reason of a measurement of the rate of emanation of the particles and which indication can be correlated with the density of contamination.

However, the rate of emanation usually is not a constant factor with the result that the indicator of the meter constantly varies over the meter dial, thus making it difficult for the observer to obtain a proper reading or determine a suitable average reading.

It is an object of this invention to provide a monitor device which for the time of measurement will integrate the total quantity of particles emanating from the person of an individual, as his hand, and thus give an indication of the contamination existant.

Since, in order to obtain a proper reading, it is desirable to insure that the summation process shall proceed through a given length of time, means must be provided to advise an individual that the time limit has not yet been reached. It is therefore a further object of the invention to provide a means to advise an individual in the event he interrupts the summation count before the time period has elapsed, as by removal of his hand from the monitor, that the count is incomplete.

It is a further object of the invention to provide a means to advise an individual that the count exceeds a predetermined safe limit or that the count is within a safe limit.

A still further object of the invention is to provide mechanism, in the event of an incomplete count, to reset the counter mechanism and meter to zero upon removal of the hand of the individual from the device.

All of the above and additional objects of the invention will become clear upon consideration of the following specification when taken in conjunction with the accompanying drawings, in which.

Figure 1:
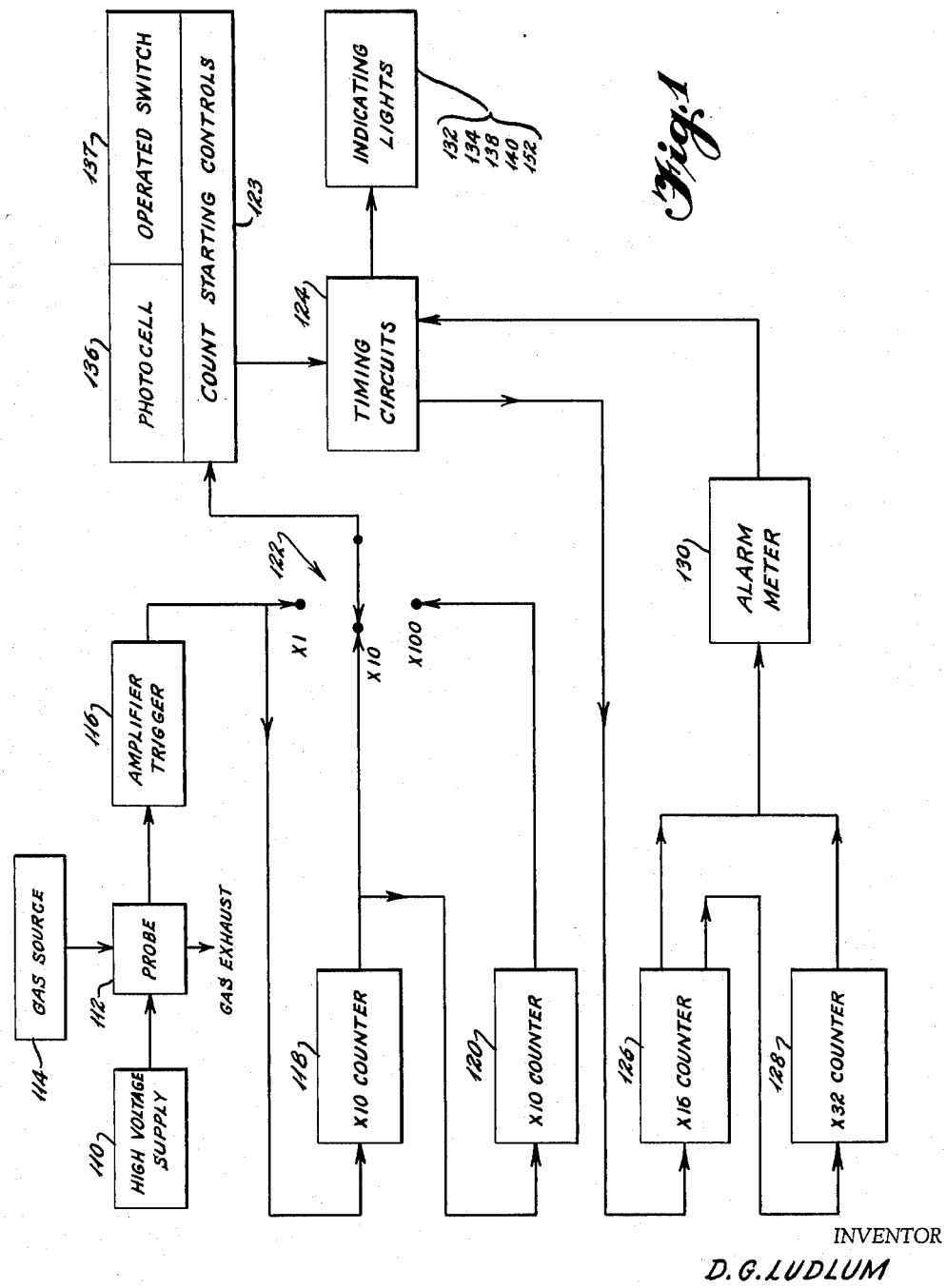
FIG. 1 is a block diagram of the circuitry employed in the monitor.

Referring to FIG. 1, a suitable high voltage supply 110 feeds high voltage to a probe 112 through which a hydrocarbon gas, such as methane or propane, at slightly above atmospheric pressure is flowing at a controlled constant rate from a supply source 114, the gas exhausting from the probe into the atmosphere. The high voltage sets up an electrostatic field in the gas flowing through the probe. When alpha particles enter the field, weak pulses are set up therein. These pulses are fed into the instrument and into an amplifier-trigger 116 where the pulses are amplified and converted into pulses of uniform height. Therefore the pulses issuing from the amplifier-trigger are indicative of the number of bursts of alpha particles existing within the probe and not of their magnitude.

The pulses from the amplifier-trigger may be fed to a pair of series connected decade counters 118 and 120 and via a range switch 122 and a count control switch 123, in amongst timer circuits 124, to two binary counters 126 and 128 in series relationship to each other and operative to transmit currents of incrementally larger magnitudes to a meter 130. The range switch can either direct the pulses from the amplifier-trigger via the switch 123 directly to the series connected binary counters, or via a decade counter to the binary counters or via both decade counters in series to the binary counters.

In the first position of the switch, low counts can be made since the first of the binary counters is operative to a count of 16 and the second to a count of 32. Thus, in this position of the range switch 122, the maximum output from the binary counters, since binary counter 128 is pulsed once each time the counter 126 reaches a count of 16 and is reset, is at a count of 512 pulses from the probe. Each of the pulses transmitted to binary counter 126 will be reflected in an advance of the meter indicator. The number of pulses at the input of decade counter 126 varies widely due to the following factors. If the count time is 5 seconds (1/12 of a minute), 1000 divided by 12 or 83 counts would be required in 5 seconds to be equal to 1000 counts in one minute. If however, it is estimated that only 1 out of 3 alpha particles will enter the probe, 83 divided by 3 or (83/3) 28 pulses would be required to drive the meter full scale. On the other hand, if it is desired to count only the particles that enter the probe on the 15 second position, 1000 divided by 4 or (1000/4) 250 pulses would be required to drive the meter full scale. The only reason for the last stage of the ×32 counter 128 that extends the count ability from 256 to 512 is to insure that at a very high count rate, where the meter response is much too slow to keep up with the variations in meter current, the average current through the meter will exceed that required to hold the meter indicator above full scale.

The meter 130 may be set to function to control an alarm at any desired reading thereon. When it does that, via the timing circuits, it controls an alarm indicator 132 in the form of an incandescent bulb, to indicate that the count is in excess of a predetermined limit. If counting ceases before such a reading is obtained, a safe indicator incandescent bulb 134 so advises an observer.

In order to condition the counters so that they may count, it is necessary for the individual to place his hand beneath the probe. When this is done a start control which may be a photocell 136 or an operator operated switch 137 will set timing circuits into operation and close the circuit for the counters, said start control being opened after a predetermined period of time. In the event the hand under the probe is removed from the probe prior to the expiration of the time set by the timing control in the timing circuits, the photocell will act on the timing circuit to stop the count and also operate a recount signal or light 138 to indicate that the count was incomplete. A further signal or counting light 140 is provided to show that a count has been initiated and is in operation.

How all of this is effected will be made clear by considering the circuit schematic of FIG. 2.

To furnish power to the monitor there is provided a 115 volt A.C. plug 141 with grounding lead, which plug, via a main switch 142 and fused conductors 144, connects with the primary coil of a transformer 146 whose secondary provides the raw A.C. for conversion into D.C. for use in the probe and other instrumentalities of the monitor. The secondary of the transformer is tapped and grounded intermediate its ends, as at 148 and the lower portion of the coil is further tapped above the ground tap as at 150 to furnish a low voltage below ground potential to instrumentalities in the monitor. Likewise a connection 151 is made to the lower end of the coil to furnish a low voltage above ground potential to others of the instrumentalities of the monitor.

Between the tap 150 and ground, and between the lower end of the coil and ground there is a potential of 12 volts A.C. When the secondary coil is energized a 12 volt pilot lamp 152 is illuminated. The high voltage from the upper end of the secondary is fed via a pair of series connected diodes 156 and 158 to a series string of resistors 160 which is tapped to secure any desired voltage, a selector switch 162 being provided for connection to the tap desired. The pulsating D.C. voltage appearing beyond the diode 158 is filtered by the capacitor 164 and resistor 166, and the voltage is regulated by the shunt voltage regulator tube 168, the current in the high voltage lines being further filtered as desired by additional resistors and capacitors connected to the line. Thus, by use of a selector switch 162 a range of high D.C. voltages may be fed to the probe. The low voltage A.C. is fed to a full wave diode rectifier 170 to the lines 172 and 174 whereto filter capacitors and resistors are added to obtain smooth D.C. voltage outputs. The line 172 is positive with respect to ground and with respect to line 174. The line 174 is negative with respect to ground and with respect to line 172, and is maintained at a desired nominal potential, as 5.8 volts below ground, by shunting Zener diode 175. Since the positive line 172 biases the bases of transistors utilized in the monitor, it is desirable to make the voltage on this line temperature stable; therefore, a thermistor 176 shunted by a resistor, if desired, is inserted in the line. The negative line is fed to the amplifier-trigger past a filter comprised of chokes 178, capacitor 180 and a current limiting resistor 182.

The amplifier-trigger includes conventionally cascaded isolating emitter follower transistors 184 and 186, the output from the transistor 186 pulsing the base of a high gain amplifier-transistor 188, the pulse then being fed across a discriminator potentiometer 189 to a monostable oscillator trigger including two transistors 192 and 194. The function of the discriminator is to set the input sensitivity to the amplifier-trigger section. It determines the minimum pulse height at the input to the first emitter follower which will cause the trigger to operate. All pulses above this level will operate the trigger. The discriminator is essentially the gain control of the amplifier section. The discriminator is used to obtain the best pulse signal to noise ratio while maintaining proper operating characteristics of the probe. The magnitude of the pulses applied to the oscillator is maintained stable despite temperature changes by use of the thermistor 190. The provision of the monostable oscillator in the trigger circuit provides for the creation of pulses of equal magnitude therefrom which are independent of the magnitudes of the pulse received from the probe so long as they are sufficient to trigger the oscillator. The potentiometer helps to maintain the level of pulses fed to the oscillator at a desired value and to cut down swamping pulses applied to the oscillator. In the output from the oscillator a pair of resistors 196 and a diode 198 is provided to prevent feedback into the oscillator circuit.

The output from the oscillator is branched. One branch is a line 200 leading to range switch 122 which, in the position shown in FIG. 2, will connect, a line 202, count control switch 123 in the timing circuits and a return line 204 directly to the cascaded pair of binary counters 126 and 128, the counter 126 being comprised of four pairs of bistable transistorized multivibrators, while the counter 128 is comprised of five such pairs. Thus, the counter 126 will function to transmit a pulse to the counter 128 after 16 pulses have been transmitted thereto. The counters 126 and 128 will transmit pulses to the meter 130 via a protective resistance 131, as will be explained, until 511 pulses or less have been received by the counters. After 512 pulses both counters 126 and 128 will reset themselves to zero. In actual practice the range of the meter indicator is such that a maximum indication will be read on the meter before the 9th transistor in counter 128 will have been rendered conductive. Since the counters 126 and 128 are in series and counter 126 resets itself after each 16th pulse, the total number of pulses which is measured by the counters is 16×32−1 or 511 pulses. On the 9th transistor in counter 128 functioning, the count stands at 256. Each transistor pair Q1 and Q2 in the binary counters has two stable states. One state is that in which the first transistor is not conducting or cut-off, and the other one is saturated or conducting at a maximum rate. This state is called "off" as it applies to this circuit. The other state is in which the first transistor is saturated and the second one is cut off. This is the "on" condition of the transistor pair.

The state of the pair can be reversed from its present condition by the application of a positive pulse to the bases of both transistors. The pulse has little effect on the cut off transistor since it tends to further stop it from conducting. However, the pulse has the tendency to cut off the conducting transistor which causes its collector to become more negative. This negative voltage is fed to the base of the other transistor which causes it to begin conducting. As it does its collector becomes positive and this voltage is applied to the base of the other transistor to further hold it cut off.

The circuits are so biased that the negative pulses applied to both bases of the transistors will not cause the transistor pair to change state.

The collector of the second transistor in each transistor pair is connected to both bases of the following transistor pair through a coupling capacitor. The state of the second pair is changed whenever the signal from the first pair is positive but not when it is negative. Because of this, each pair must undergo two changes of state before the following pair will change once.

To transmit current from each of the transistor pairs of counters 126 and 128 as the transistors are fired, each of the collectors of the second transistors of a pair in the counters is connected via a diode 205 and series resistor 206 to a common line 207 to deliver currents thereto of increasing magnitudes as the pulses are fed to the counters. The line 207 is connected to the meter 130 to advance its indicator with each pulse. When any second transistor Q2 is saturated, its collector conducts current to the meter. A.C. capacitors 208 and 209 are employed to filter the pulses to the meter, prevent spurious reflected pulses from advancing the counter and to steady the indicator position. The meter has an adjustable switch element or limit switch 210 controlling the timer circuits which may be adjusted on the meter to be operated by the meter indicator at any desired position of the indicator. The timer circuit will therefore be controlled at any desired count on the meter. To calibrate the meter independently for each of three desired periods of operation of this counter so as to obtain substantially full scale operation for each period, independent potentiometers 211 are provided, shiftable to meter calibrate position simultaneously with adjustment of the adjustment of time period of counter operation.

Means to be described limit the counter operation to selected intervals, as 5, 10, and 15 seconds. Therefore any count to a maximum of 511 pulses received by the trigger, as in five seconds, will be transmitted to the meter. If the pulses come in a slower rate and it is desired to count all of them the period can be changed to 10 or to 15 seconds. Obviously, other time periods can be provided. If the pulses come in at too fast a rate with the use of the binary counters and the described time periods, the decade counters may be interposed between the amplifier-trigger and binary counters, as will be described. With a five second interval the count measured could be up to 12×511 pulses per minute or roughly 1000 pulses per minute. In actual use the meter is so set that no more than 256 steps of the counters 128 and 126 bring about traverse of the meter indicator over substantially the whole of the scale on the dial. The provision of the last stage of the second binary counter is to insure that the meter indication could be brought to full scale.

Figure 2:
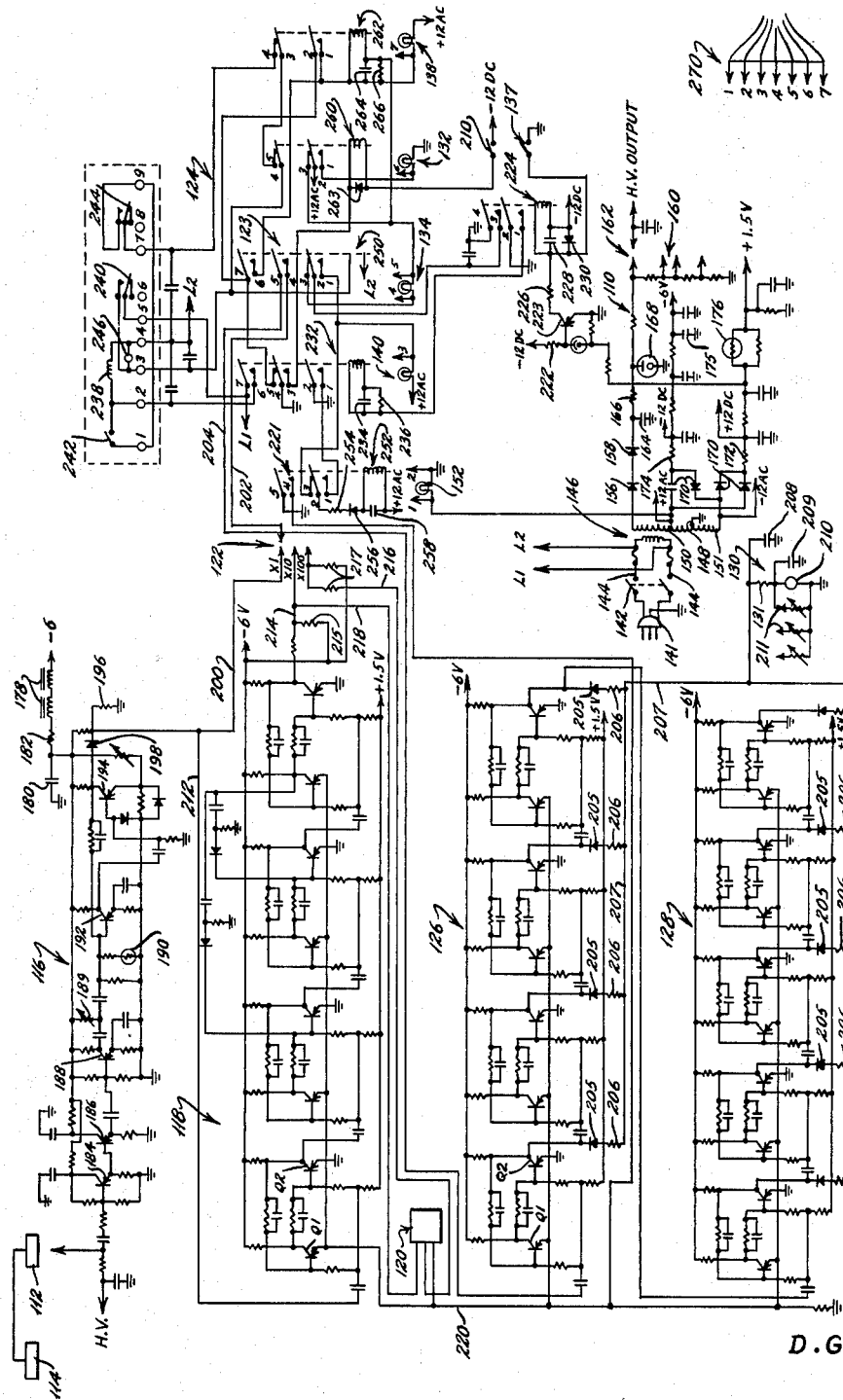
FIG. 2 is a detailed schematic of the circuitry of the monitor.

As stated, heretofore, in the position of the range switch illustrated in FIG. 2, the decade counters are by-passed and the pulses are transmitted from the amplifier-trigger directly to the binary counter 126. When the range switch 122 is placed in the second or ×10 position, the decade counter 118 is interposed between the amplifier-trigger and the ×16 binary counter 126. This is because, as explained heretofore, the output from the amplifier-trigger 116 is divided and a branch 212 of the output from the trigger feeds the decade counter 118 whose output line 214 is now fed into line 202 via a noise reducing network consisting of resistors 215; the line 202 is disconnected from line 200. In the third or ×100 position of the switch 122, the line 202 is connected to output line 216 via noise reducing network 217, the line 216 being the output from decade counter 120. In this last position of the switch, the lines 200 and 214 are disconnected from line 202. But output line 214 does feed into line 218 which is the input line to decade counter 120. Since decade counter 120 is identical with decade counter 118, it has not been illustrated in detail. Each of the decade counters converts signals normally transmitted therethrough in binary form to a decade count. This is accomplished by reflexing the signal at the 8th pulse to reset transistors in the second and third stages as if the count were 14 in the binary system. After two more pulses or an actual count of 10, the lines 214 will carry the emitted pulse from the last stage of the counter and the counter will reset to zero. Since the specific character of this decade counter is not being claimed, no further description thereof is given. Any known form of decade counter may be substituted for the one disclosed.

The ×16 binary counter 126 and ×32 binary counter 128 are alike except that counter 126 has four sets of multivibrators while counter 128 has five sets.

All of the counters can be reset to zero by connecting the emitters of the multivibrators which are not grounded in the counters to a common reset line 220 which leads back into the timing circuits and which during count is grounded via a reset switch contact 221 therein. In resetting the counters, this timing circuit ground is removed thereby automatically causing all of the transistors to be restored to zero count condition.

The count starting controls and associated timing circuits will now be described.

The photocell 136 is bridged across the D.C. lines so that current normally flows upwardly therethrough and through resistor 222. When no hand obstructs the beam of light reaching the photocell, its resistance is low and the voltage appearing at the junction between the photocell and resistor is sufficiently positive to maintain a cutoff potential on the base of a transistor 223 connected to this junction. As a result very little current flows through the emitter collector circuit of the transistor. When the hand is interposed in the beam of light, the potential at the junction drops and the transistor becomes operative to conduct sufficient current in its emitter-collector circuit to energize the coil of a relay 224. The operator operated switch 137 shunts the emitter-collector circuit and therefore will alternatively function to energize the relay 224 when the switch is closed. The photocell (or the switch 137) and the transistor thus in effect form a switching device. A current limiting resistor 226 is employed to limit the collector current, and a capacitor 228 which may be shunted by a diode 230, is employed to dissipate inductive surge of the relay coil of relay 224 when it is opened. When the coil of relay 224 is energized it closes a pair of contacts 1 and 2 connecting one end of the coil of a relay 232 to ground, the other end of the coil of a relay 232 to ground, the other end of the coil being connected to the secondary coil of the transformer at the point labeled +12 A.C. The relay 232 is a fast acting and releasing relay and like the coil of relay 224 is provided with a capacitor 234 shunted by a resistor 236 in the supply line to the coil.

When the relay 232 closes, power is supplied to a solenoid 238 forming part of the timer. The circuit to the solenoid may be traced from $L_1$ of the 115 volt A.C. line to contacts 7 and 6 of relay 232, thence to terminal 2 of the timer, through the solenoid, to terminal 4 of the timer and back to $L_2$ of the 115 volt A.C. line. When the solenoid is energized, three timer switches 240, 242 and 244 are closed. Closure of the switch 240 energizes a timer motor 246, current flowing from $L_1$ to terminal 5 of the timer, thence via timer switch 240 to the motor, terminal 4 of the timer and back to $L_2$.

The motor drives a mechanical device operative after a predetermined set time, as 5, 10 or 15 seconds, to mechanically shift the timer operated switches 240 and 244 to open position.

At the same time that the motor is set into operation, power is supplied to the coil of a relay 250, this power flowing via timer operated switch 240, terminal 3 of the timer to the coil and line $L_2$. This relay 250, via its time controlled switch contacts 4 and 5, completes the circuit from the amplifier-trigger via the range switch 122 to the binary counter 126. Also the closing of the contacts 1 and 2 of relay 250 closes the circuit through the counting signal device or incandescent bulb 140, to indicate that counting has begun, the circuit to the lamp being from the +12 A.C. tap on the secondary of the transformer, the contacts 1 and 2 of relay 250, contacts 3 and 4 of relay 224, and ground, back to the transformer secondary terminal 148. Ground potential is also applied to contact 3 of relay 252, and, through cooperating contact 2, current limiting resistor 254 and diode 256 to the coil of relay 252 and thence to the +12 A.C. line. The relay coil, because of the shunting capacitor 258, will pull up slowly to establish its own holding circuit via its contacts 2 and 1 and the contacts 2 and 1 of relay 232, that is to say there is a substitution of ground potential to the counters to enable them to function when pulses are applied to the multivibrators.

When the counter is set into operation and counting does not cease by reason of premature removal of the hand (or opening of the manual switch 137) or by reason of an excessive count operating the alarm, as will be explained, the timer motor, through its mechanical drive, will open the switches 240 and 244. Opening of the switch 240 will remove line $L_1$ from the relay coil 250 allowing the contacts of this relay to open. As this relay opens, the pulsing circuit to the counters is open at the relay's contacts 4 and 5 (switch 123). At the same time a circuit will be closed at the "safe" signal or incandescent bulb 134, this circuit being traced as follows: From ground to contacts 4 and 3 of relay 224 to contacts 2 and 3 of relay 250, "safe" light 134, contacts 3 and 4 of a relay 260 which is unoperated so long as a safe count is not exceeded and thence to the line marked +12 A.C. Also, as relay 250 opens, the previously disclosed circuit to the "counting" light 140 via the relay contacts 1 and 2 opens, thereby indicating that counting has ceased. Likewise, switch contacts 4 and 5 (hitherto identified as time controlled switch 123) of relay 250 opens, interrupting the transmission of pulses from the amplifier-trigger to the counters.

Under this condition, the meter reading will be retained on the meter and the safe light will be held on so long as the hand is held beneath the probe or the switch 137 is closed. When the hand is removed (or the switch 137 opened) the coil of relay 224 will no longer be energized thereby breaking the circuit to the "safe" light 134 via relay contacts 3 and 4 of relay 224, and the relay 232 will open since ground potential to the coil of the relay is removed by opening of the contacts 1 and 2 of relay 224. When relay 232 opens, the circuit to the solenoid 238 via relay contacts 6 and 7 is broken, allowing the switch 242 to open and the timer mechanism to reset itself to zero. Also via contacts 1 and 2 of relay 232, the ground connection to the self-locking circulit of the relay 252 is broken allowing the relay 252 to open. When relay 252 opens, potential via contacts 4 and 5 (reset switch 221) is removed from the reset line to the counters whereby all of the counters automatically reset themselves to zero, thus putting the instrument in condition for the next count.

If during a counting cycle, the alarm light 132 and its associated circuit has not been activated, and the hand is removed from beneath the probe, the recount signal or light 138 will be energized. As the hand is withdrawn, the coil of relay 224 will be de-energized, causing, as heretofore explained, the opening of relay 232. Relay 250, however, will still be closed. As relay 232 opens the coil of a relay 262 by-passed by surge discharging diode 263, will be energized, the path of current being from ground to contacts 4 and 5 of relay 232, contacts 7 and 6 of relay 250, the coil of relay 262 to contacts 3 and 2 of relay 260 and to the line marked +12 A.C. At the same time a circuit will be established for the "recount" signal or light 138 via ground contacts 4 and 5 of relay 232, contacts 7 and 6 of relay 250, the recount lamp 138 and the line marked +12 A.C. The relay 262 is made slow to pull up by the use of capacitor 264 and a shunting resistor 266.

Timer motor 246 is held activated by a holding circuit from line $L_1$ through terminal 5 of the timer, switch 240, the motor terminal 4 of the timer and line $L_2$. Until relay 262 has been operated solenoid 238 will be held energized through the following circuit: from line $L_1$ to timer terminal 5 through switch 240, terminal 3 of the timer, contacts 4 and 5 of relay 260, contacts 3 and 4 of fast closing and opening relay 262, timer terminal 7, switch 244, timer terminals 9 and 1, switch 242, solenoid 238, timer terminal 4 and line $L_2$. The relay 250 is held closed, so long as solenoid 238 is energized by a holding circuit which runs from line $L_1$ via terminal 5 of the timer, switch 240, terminal 3 of the timer, the coil of relay 250 to the line $L_2$. Relay 250 will not begin to open until the relay 262 has closed sufficiently to break contacts 3 and 4. This assures that the holding circuit of relay 262 will be established before the ground path through contacts 7 and 6 of relay 250 is lost. When contacts 4 and 3 of relay 262 open, the timer circuit and relay 250 will be de-energized. The holding circuit of relay 262 completely by-passes relay 250 so that the "recount" light 138 will be held on after relay 250 opens. This recount light will remain on until the next counting cycle begins. The relay 262 is provided with a capacitor 264 and resistor 266 like the relay 232.

If during a counting cycle the count rate exceeds a preset maximum, the meter limit switch 210 will close, causing the alarm signal or light 132 to come on. When the meter switch closes the −12 D.C. line is placed on one side of relay 260 wherefore current flows through the coil of relay 260 to contacts 3 and 4 of relay 232 and thence to ground. As relay 260 closes, the alarm light is placed in a circuit traced from ground, through the light, contacts 1 and 2 of the relay 260 and to the line marked +12 A.C. When the alarm circuit is energized, the hand can be immediately removed since no further information will be obtained by holding the hand beneath the probe. However, if the hand is under the probe at the end of a timing cycle, the "safe" light 134 will be prevented from coming on because of the breaking of the circuit thereto at contacts 3 and 2 of relay 260. If, when the "alarm" light is on, the hand is removed from beneath the probe before the end of the timing cycle, the "recount" light will be prevented from coming on, because the holding circuit for relay 250 and the timer is broken at contacts 5 and 4 of relay 260. Contacts 7 and 6 of relay 250 will be open before relay 262 has time to pull in. This prevents the recount light from coming on.

Each of the pilot lamps is provided with jacks into all of which a plug 270 may be inserted for obtaining telemetric indications of the functioning of the circuit.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A monitor for measuring outputs from a probe, said monitor comprising an electrical circuit including a trigger for receiving signals from the probe and converting them to pulses of equal magnitudes, a meter, circuit connections between the trigger and the meter to advance the reading on the meter in proportion to the number of pulses delivered by the trigger, an alarm signal under control of the meter and operative when the meter reading reaches a predetermined value, a timing motor and circuit connections operated thereby to disconnect the connections between the trigger and the meter, means causing said alarm signal to operate when the count on the meter reaches the predetermined value prior to the timing motor operating to disconnect said connections, a safe signal, and circuit connections under control of the timer to operate said safe signal when the meter does not reach the predetermined value prior to the timing motor disconnecting said connections.

2. A monitor for measuring outputs from a probe, said monitor comprising an electrical circuit including a trigger for converting pulses fed thereto from the probe to pulses of equal magnitudes, a counter, a meter, circuit means connecting the output of the trigger to the counter and the output of the counter to the meter to thereby advance the meter in proportion to the number of pulses issuing from the trigger, a limit switch in the meter closed when the meter advances to a predetermined degree, an alarm signal connnected to said switch and, during counting, set into operation when the switch is closed, a timing motor and first circuit controlled thereby to disconnect the output of the trigger from the counter and meter at the end of a predetermined period of time, a safe signal, and circuit means operative in response to the opening of said first circuit during counting and in response to the limit switch remaining in unopened position to operate said safe signal.

3. A monitor for measuring outputs from a probe, said monitor comprising an electrical circuit including a trigger for receiving the signals from the probe and converting them to pulses of equal magnitudes, a meter having an indicator, a counter connected to feed progressively larger currents to the meter, a decade counter, a range switch to connect, at will, the output from said trigger to said counter either directly or via the decade counter, a limit switch in the meter operated upon the indicator in the meter reading a predetermined position, a timer motor and switches operated thereby at the end of a predetermined period, first and second signal circuit means controlled by the indicator operated switch and by the timer operates switches whereby one of the signals will be operated upon the indicator operating its limit switch prior to the opening of the motor operated switches, the second signal being operated when the motor operated switches open prior to the indicator operating the limit switch.

4. A monitor for measuring outputs from a probe, said monitor comprising an electrical circuit including a trigger for converting pulses transmitted therethrough to pulses of equal magnitudes, a meter responsive to the output from the trigger and having an indicator movable a distance proportional to the number of pulses issuing from the trigger, a count start switch between the trigger output and the meter, a limit switch on the meter closed by the indicator upon reaching a predetermined position, a timer and timer operated switch controlled thereby, a switching device under operator control to initiate the counting cycle, a recount signal, connections between the limit switch and timer operated switches to operate the recount signal upon the count start switch being opened prior to either the indicator reaching said predetermined position or the timer operated switches being opened.

5. A monitor for measuring outputs from a probe, said monitor comprising an electrical circuit including a trigger for converting pulses transmitted therethrough to pulses of equal magnitudes, a meter responsive to the output from the trigger and having an indicator movable a distance proportional to the number of pulses issuing from the trigger, a count start switch between the trigger output and the meter, a circuit for controlling the operation of the count start switch, a timer, a timer operated switch in said circuit operated by said timer after a predetermined period of operation, a limit switch in the meter operated by the indicator upon reaching a predetermined position, an alarm signal set into operation by said limit switch when it is operated, a safe signal and circuit means to energize the safe signal when, during counting, the count start switch is opened prior to the operation of the limit switch.

6. A monitor for measuring outputs from a probe, said monitor comprising an electrical circuit including a trigger for converting pulses transmitted therethrough to pulses of equal magnitudes, a meter responsive to the output of said trigger and having an indicator movable a distance proportional to the number of pulses issuing from the trigger, a count start switch between the trigger and the meter, a circuit for operating the count start switch, a timer, a switching device and a circuit controlled thereby for initiation of operation of said timer, a timer operated switch in said circuit operated by said timer after a predetermined period of operation, a counting signal energized synchronously with the initiation of operation of the timer, a limit switch in the meter operated by the indicator upon reaching a predetermined position, an alarm signal set into operation by said limit switch when it is operated, a safe signal, and circuit means to energize the safe signal when during counting the count start switch is opened prior to the operation of the limit switch.

7. A monitor for measuring outputs from a probe, said monitor comprising an electrical circuit including a trigger for converting pulses transmitted therethrough to pulses of equal magnitudes, a meter responsive to the output of said trigger and having an indicator movable a distance proportional to the number of pulses issuing from the trigger, a count start switch between the trigger and the meter, a circuit for operating the count start switch, a timer, a switching device and circuit controlled thereby for initiation of operation of said timer, a timer operated switch in said circuit operated by said timer after a predetermined period of operation, a counting signal energized synchronously with the initiation of operation of the timer, a limit switch in the meter operated by the indicator upon reaching a predetermined position, an alarm signal set into operation by said limit switch when it is operated, a safe signal, circuit means to energize the safe signal when during counting the count start switch is opened prior to the operation of the limit switch, said switching device being under hand control, a recount signal and a circuit to energize said recount signal upon removal of the hand from the switching device prior to the indicator reaching the limit switch and prior to the timer operating the switch controlled thereby.

8. A monitor for measuring outputs from a probe, said monitor comprising an electrical circuit including a trigger for receiving pulses from the probe and converting them to pulses of equal magnitude, a meter, circuit connections including a count control switch between the trigger and the meter to advance the reading on the meter in proportion to the number of pulses delivered by the trigger, a switching device under hand control and effective to transmit effective current only so long as the hand is close to the device, a circuit under control of the switching device and operative to effect closure of the count control switch, a timer and a count signal also controlled by operation of the switching device, a limit switch on the meter under control of its indicator, an alarm signal, a circuit to said alarm signal closed when the indicator closes the limit switch, a timer set into operation upon the hand operating the switching device, means under control of the timer for opening the count control switch after a predetermined period of operation of the timer, a safe signal circuit controlled by said timer and closed when the hand is still closed to the switching device and the alarm signal has not been energized, and circuit means to render the safe signal circuit ineffective upon closure of the limit switch prior to timer operation to open the count control switch.

9. A monitor for measuring outputs from a probe, said monitor comprising an electrical circuit including a trigger for receiving pulses from the probe and converting them to pulses of equal magnitudes, a meter, connections including a count control switch between the trigger and the meter to advance the reading on the meter in proportion to the number of pulses delivered by the trigger, a switching device under hand control and effective to transmit current only so long as the hand is close to the device, a circuit under control of the switching device and operative to effect closure of the count control switch, a timer and a count signal also controlled by operation of the switching device, a limit switch on the meter under control of its indicator, an alarm signal, a circuit to said alarm signal closed when the indicator closes the limit switch, a timer set into operation upon the hand operating the switching device, means under control of the timer for opening the count control switch after a predetermined period of operation of the timer, a safe signal circuit controlled by said timer and closed when the hand is still in close to the switching device and the alarm signal has not been energized, and circuit means to render the safe signal circuit ineffective upon closure of the limit switch prior to timer operation to open the count control switch, a recount signal, and an additional circuit to energize the recount signal upon removal of the hand from close to the switching device prior to either the safe or alarm signals being energized.

10. A measuring device for measuring the output of a probe, said device comprising a trigger for converting pulses from the probe to pulses of equal magnitude, a pair of decade counters, a binary counter, a meter and a range switch having a number of contacts and a common pole for selectively engaging said contacts, circuits connecting the output of said trigger to both the input of the first of the decade counters and a first contact of said range switch, a circuit connecting the output of said first decade counter to a second contact of said range switch and to the input of the second decade counter, a circuit connecting the output of the second decade counter to a third contact on said range switch, a circuit connecting the common pole of the range switch to the input of the binary counter and a circuit connecting the output of the binary counter to the meter, and means for simultaneously resetting the decade and binary counters.

11. The measuring device as set forth in claim 10 wherein in addition there is a second binary counter in series with the first binary counter and the meter is connected as well with the output of the second binary counter.

12. A monitor comprising a probe, an electrical circuit including a trigger receiving pulses from the probe and converting them into pulses of equal magnitudes, a meter having an indicator, connections between the output of the trigger and the meter to advance the meter indicator, a distance proportional to the number of pulses delivered by the trigger, a limit switch in the indicator closed by the indicator upon a predetermined movement thereof and an alarm signal circuit including an alarm signal operated by said limit switch, a timer, a timer operated switch, and a safe signal, said safe signal being energized when the timer operates the timer operated switch, the safe circuit and the alarm signal circuit being interrelated to prevent operation of the safe signal upon operation of the limit switch.

13. A monitor comprising a probe, an electrical circuit including a trigger receiving pulses from the probe and converting them into pulses of equal magnitudes, a meter having an indicator, connections between the output of the trigger and the meter to advance the meter indicator a distance proportional to the number of pulses delivered by the trigger, a limit switch in the meter closed by the indicator upon a predetermined movement thereof and an alarm signal circuit including an alarm signal operated by said limit switch, a timer, a timer operated switch, a safe signal, said safe signal being energized when the timer operates the timer operated switch, the safe circuit and the alarm signal circuit being interrelated to prevent operation of the safe signal upon operation of the limit switch, means to vary the period of operation of the timer on the time operated switch, a number of calibrate potentiometers connected interchangeably to said meter, and means to concomitantly vary the period of operation of the timer and interchange the calibrate potentiometer which is connected to the meter for another of the potentiometers.

14. A measuring device for measuring the output of a probe, said device comprising an electrical circuit including a trigger for receiving signals from the probe and converting them into pulses of equal magnitude, a counter, circuit connections between the trigger and the counter to advance the counter, a switching device under hand control, a timer circuit including a timer motor, circuits under control of the switching device to initiate operation of the timer motor and to initiate operation of the counter, circuits under control of the timer motor and operated a predetermined time after start of the motor to terminate the operation of the counter, and circuit means responsive to the concurrent cessation of count by action of the timer motor and the removal of the hand from the switching device to reset the counter.

15. A measuring device for measuring the output of a probe, said device comprising an electrical circuit including a trigger for receiving signals from the probe and converting them to pulses of equal magnitudes, a counter, circuit connections including a count starting switch to transmit pulses from the trigger to the counter, a timer solenoid, and a timer motor, a switching device under hand control and circuits controlled thereby to initiate operation of the solenoid and motor, the circuit through said count starting switch being closed upon energization of said solenoid, circuits under control of the timer motor to open the count starting switch after a predetermined period of operation of the timer motor, circuit connections to the counter to reset the counter, and additional circuit connections to prevent resetting of the counter prior to the predetermined period of motor operation not taking place and prior to removal of the hand from the switching device and replacement of the hand.

16. A measuring device for measuring the output of a probe, said device comprising an electrical circuit including a trigger for receiving signals from the probe and converting them to pulses of equal magnitudes, a counter, circuit connections including a count starting switch to transmit pulses from the trigger to the counter, a timer solenoid, a timer motor, a switching device under hand control and circuits controlled thereby to initiate operation of the solenoid and motor, the circuit through said count starting switch being closed upon energization of said solenoid, circuits under control of the timer motor to open the count starting switch after a predetermined period of operation of the timer motor, circuit connections to the counter to reset the counter, a recount signal and second circuit connections thereto operative to become energized in the event the hand is removed from the switching device prior to the timer motor operating for the predetermined time, and additional circuit connections to prevent resetting of the counter and de-energization of said recount signal prior to the predetermined period of motor operation not taking place and prior to removal of the hand from the switching device and replacement of the hand.

17. In a device for counting alpha particles emanating from the hand of an individual, a probe, conduit means for flowing a gas through the probe, a high potential applied to the gas to set up an electrostatic field therein, alpha particles from the hand placed adjacent the probe creating electrical pulses that issue from the probe, a counter for counting these pulses and signals under control of the number of pulses that issue from the probe in a given time, to indicate whether or not the alpha emanation is in excess of a predetermined value and additional signal means to indicate the withdrawal of the hand from the probe prior to the expiration of said given time.

18. In a device for counting alpha particles emanating from the hand of an individual, a probe, conduit means for flowing a gas through the probe, a high potential applied to the gas to set up an electrostatic field therein, alpha particles from the hand placed adjacent the probe creating electrical pulses that issue from the probe, a counter connected to said probe while the gas is flowing therethrough for counting these pulses, and signals under control of the number of pulses that issue from the probe in a given time, to indicate whether or not the alpha emanation is in excess of a predetermined value and additional signal means to indicate the withdrawal of the hand from the probe prior to the expiration of said given time.

References Cited by the Examiner
UNITED STATES PATENTS

| | | | |
|---|---|---|---|
| 2,563,841 | 8/51 | Jensen | 328—48 |
| 2,619,282 | 11/52 | Manley | 328—48 |
| 2,632,882 | 3/53 | Jupp | 340—181 |
| 2,685,027 | 7/54 | Alvarez | 250—83.3 |
| 2,756,410 | 7/56 | Tobias | 340—181 |
| 2,829,270 | 4/58 | Davidon | 250—83.3 |
| 2,916,626 | 12/59 | Thomas et al. | 250—83.6 |
| 2,952,777 | 9/60 | Barnothy | 250—83.3 |
| 2,957,084 | 10/60 | Marr et al. | 250—83.6 |
| 2,965,759 | 12/60 | Eberline | 250—83.6 |
| 2,972,678 | 2/61 | Anton et al. | 250—83.6 |
| 2,982,857 | 5/61 | Clarke | 250—83.3 |
| 2,984,746 | 5/61 | Speh et al. | 250—83.3 |
| 3,019,339 | 1/62 | Wesley | 250—83.3 |
| 3,093,738 | 6/63 | Mann et al. | 250—83.3 |

RALPH G. NILSON, *Primary Examiner.*
ARTHUR GAUSS, *Examiner.*